(12) United States Patent
Maeda

(10) Patent No.: US 12,339,484 B2
(45) Date of Patent: Jun. 24, 2025

(54) LIGHT SOURCE APPARATUS AND IMAGE DISPLAY APPARATUS

(71) Applicant: CANON KABUSHIKI KAISHA, Tokyo (JP)

(72) Inventor: Yuuki Maeda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/608,631

(22) Filed: Mar. 18, 2024

(65) Prior Publication Data

US 2024/0319427 A1 Sep. 26, 2024

(30) Foreign Application Priority Data

Mar. 24, 2023 (JP) ................................. 2023-047746

(51) Int. Cl.
*F21V 8/00* (2006.01)
(52) U.S. Cl.
CPC ............ *G02B 6/0031* (2013.01); *G02B 6/005* (2013.01)
(58) Field of Classification Search
CPC .............................. G02B 6/005; G02B 6/0031
See application file for complete search history.

(56) References Cited

U.S. PATENT DOCUMENTS

2020/0292840 A1   9/2020   Popovich
2021/0018674 A1*  1/2021   Tan .................... G02F 1/134309

* cited by examiner

*Primary Examiner* — Thomas M Sember
(74) *Attorney, Agent, or Firm* — Canon U.S.A., Inc. IP Division

(57) ABSTRACT

A light source apparatus includes a light source, and a light guide member which a light beam from the light source enters. The light guide member includes a reflector configured to reflect the light beam on a first surface of the light guide member, and a separator configured to separate the light beam on a second surface of the light guide member different from the first surface into a reflected light beam and a transmitting light beam. The light beam incident on the light guide member is reflected by each of the reflector and the separator and propagates in a first direction. Among light beams propagated through the light guide member, the light beam separated by the separator is emitted from the light guide member. An incident angle of the light beam incident on the second surface of the light guide member is smaller than a critical angle.

19 Claims, 6 Drawing Sheets

LIGHT SOURCE APPARATUS AND IMAGE DISPLAY APPARATUS

BACKGROUND

Technical Field

One of the aspects of the embodiments relates to a light source apparatus and an image display apparatus.

Description of Related Art

U.S. Patent Application Publication No. 2020/0292840 discloses a configuration that causes light guide plates to guide light through total reflection using a diffractive element, divides light into a plurality of light beams using the diffractive element, and illuminates an image display element.

The configuration disclosed in U.S. Patent Application Publication No. 2020/0292840 requires a plurality of light guide plates to uniformly illuminate the image display element using light beams with a plurality of wavelengths because a diffraction angle of the diffractive element changes depending on the wavelength. In addition, the performance of a diffractive element significantly changes due to minute structural changes. Thus, the disclosed configuration has difficulty in highly efficiently and uniformly illuminating the image display element using a compact configuration.

SUMMARY

A light source apparatus according to one aspect of the disclosure includes a light source, and a light guide member which a light beam from the light source enters. The light guide member includes a reflector configured to reflect the light beam on a first surface of the light guide member, and a separator configured to separate the light beam on a second surface of the light guide member different from the first surface into a reflected light beam and a transmitting light beam. The light beam incident on the light guide member is reflected by each of the reflector and the separator and propagates in a first direction. Among light beams propagated through the light guide member, the light beam separated by the separator is emitted from the light guide member. An incident angle of the light beam incident on the second surface of the light guide member is smaller than a critical angle. An image display apparatus having the above light source apparatus also constitutes another aspect of the disclosure.

Further features of various embodiments of the disclosure will become apparent from the following description of embodiments with reference to the attached drawings.

DESCRIPTION OF THE EMBODIMENTS

Figure 1:
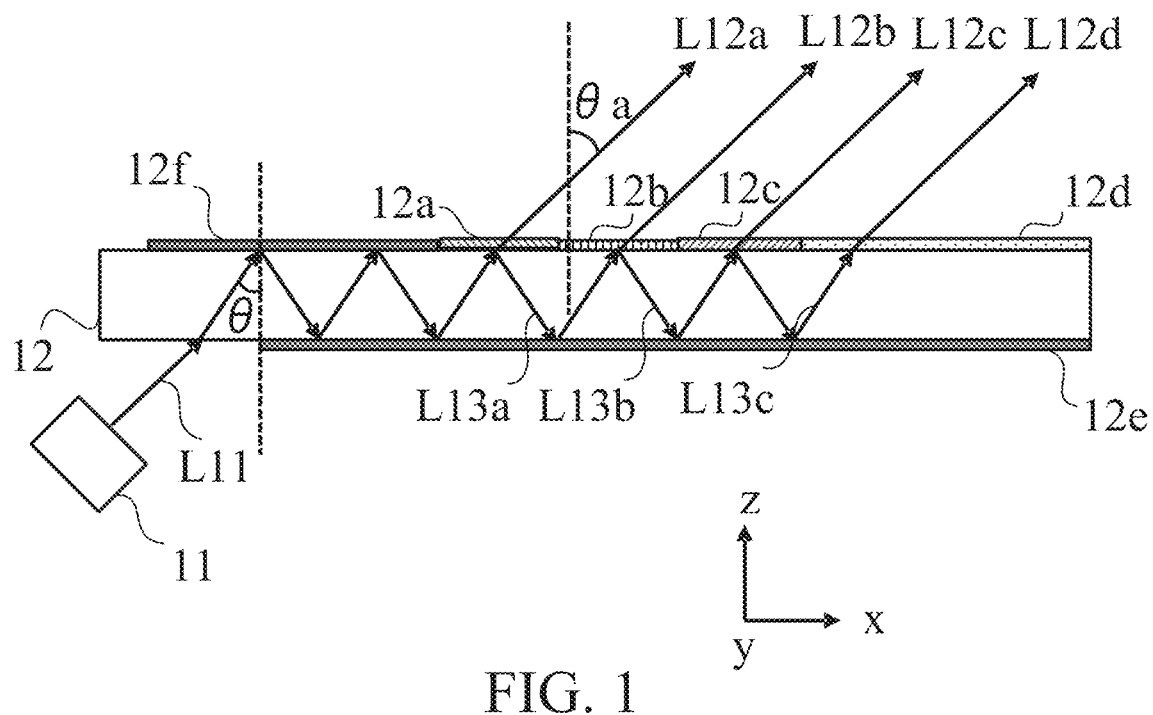
FIG. 1 is a configuration diagram of a light source apparatus according to Example 1.

Referring now to the accompanying drawings, a detailed description will be given of embodiments according to the disclosure. Corresponding elements in respective figures will be designated by the same reference numerals, and a duplicate description thereof will be omitted.

Example 1

Referring now to FIG. 1, a description will be given of a light source apparatus 10 according to Example 1. FIG. 1 is a configuration diagram of the light source apparatus 10. The light source apparatus 10 includes a light source 11 and a light guide plate (light guide member) 12.

The light source 11 includes a laser light source that emits collimated light (parallel light), and emits a light beam obtained by collimating the light beam from the laser light source using a collimator lens. However, this example is not limited to this implementation, and may use a light source that combines a collimated beam of laser beams of two or more colors. In this example, a light source such as an LED (light emitting diode) or a mercury lamp may be configured to emit a collimated light beam. In this example, the light source 11 emits collimated light that is a combination of laser beams having wavelengths of 450 nm, 520 nm, and 635 nm. The light guide plate 12 includes a first dielectric film 12a, a second dielectric film 12b, a third dielectric film 12c, a fourth dielectric film 12d, a fifth dielectric film 12e, and a sixth dielectric film 12f (a plurality of dielectric multilayer films). The light guide plate 12 has a first surface (the bottom surface of the light guide plate 12 in FIG. 1) and a second surface different from the first surface (a surface opposite to the first surface, that is, the top surface of the light guide plate 12 in FIG. 1). The first dielectric film 12a, the second dielectric film 12b, the third dielectric film 12c, the fourth dielectric film 12d, and the sixth dielectric film 12f are formed on the second surface, and the fifth dielectric film 12e is formed on the first surface. The first dielectric film 12a, the second dielectric film 12b, and the third dielectric film 12c constitute a separator (separating unit) that has a characteristic of dividing a light beam propagating at a ray angle θ (degrees), that is, an incident angle on the second surface of the light guide plate 12 within the light guide plate 12 at a predetermined ratio. In other words, the separator is configured to separate the light beam on the second surface of the light guide plate 12 different from the first surface into a reflected light beam and a transmitting light beam.

In this example, the incident angle (ray angle θ) of the light beam incident on the second surface of the light guide plate 12 is smaller than the critical angle. This is also applied to each examples described below.

Figure 2:
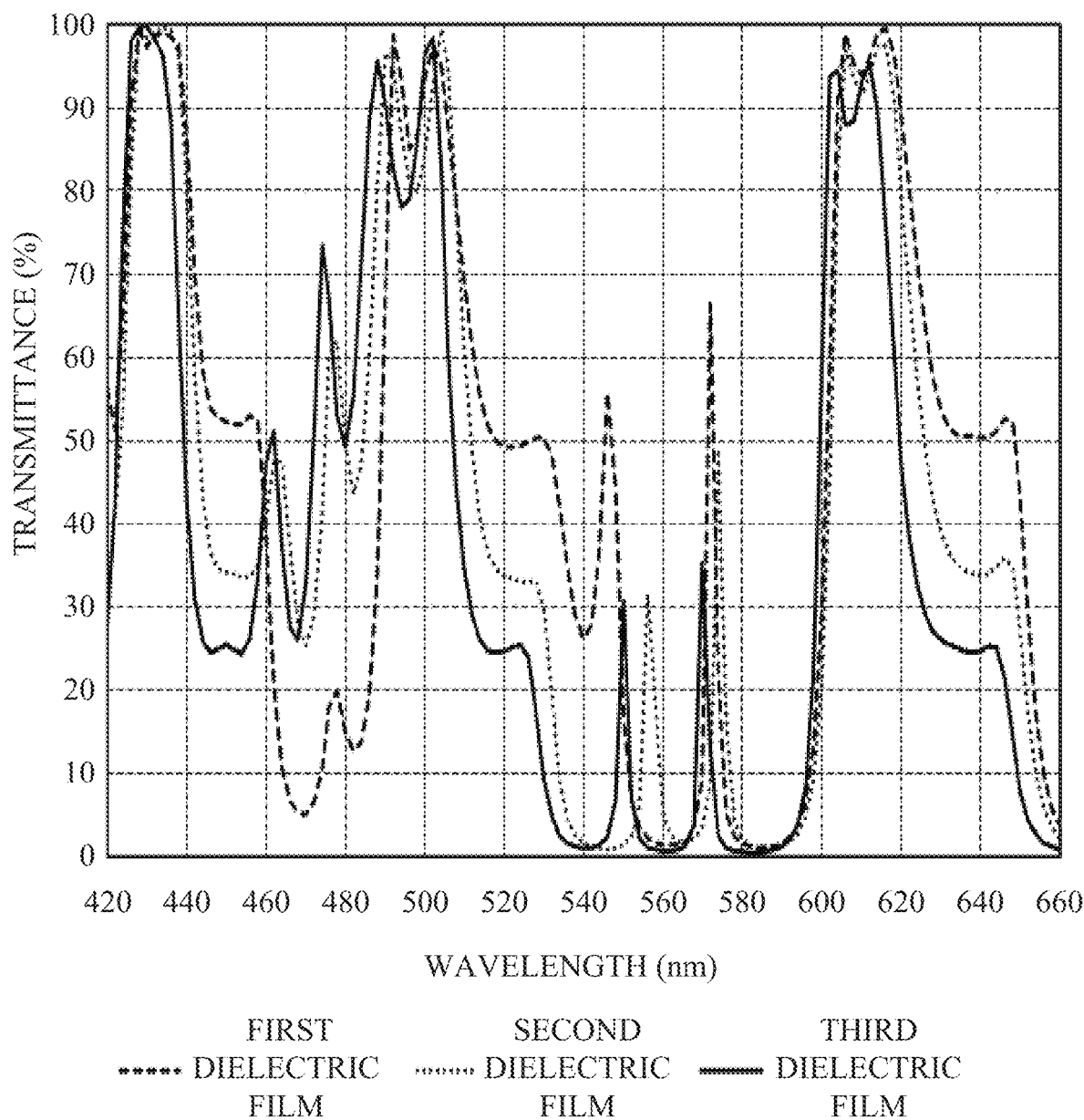
FIG. 2 is a film characteristic diagram of a light guide plate according to Example 1.

FIG. 2 is a film characteristic diagram of each of the first dielectric film 12a, second dielectric film 12b, and third dielectric film 12c in the light guide plate 12. In FIG. 2, the horizontal axis represents wavelength (nm), and the vertical axis represents transmittance (%). Ideally, the transmittance of the first dielectric film 12a is 25%, the transmittance of the second dielectric film 12b is 33.3%, and the transmittance of the third dielectric film 12c is 50%. In this example, the refractive index n of the light guide plate 12 is n=1.52, and a light ray angle in the light guide plate 12 is θ=21.6 degrees. The fourth dielectric film 12d is an antireflection film. The fifth dielectric film 12e and the sixth dielectric film 12f are reflective films (reflector) configured to reflect the light beam at the light beam angle θ.

A light beam L11 from the light source 11 enters the light guide plate 12, is guided in the x direction (first direction) via the fifth dielectric film 12e and the sixth dielectric film 12f, and is separated into a light beam L12a (25% of the light beam L11) and a light beam L13a (75% of the light beam L11) at the first dielectric film 12a. The light beam L13a is separated into a light beam L12b (25% of the light beam L11) and a light beam L13b (50% of the light beam L11) at the second dielectric film 12b. The light beam L13b is separated into a light beam L12c (25% of the light beam L11) and a light beam L13c (25% of the light beam L11) at the third dielectric film 12c. The light beam L13c is emitted as a light beam L12d (25% of the light beam L11) via the fourth dielectric film 12d. The light beam L12 (L12a, L12b, L12c, L12d) emitted from the light guide plate 12 is used as a light beam for illuminating an unillustrated image display element or the like.

Figure 3:
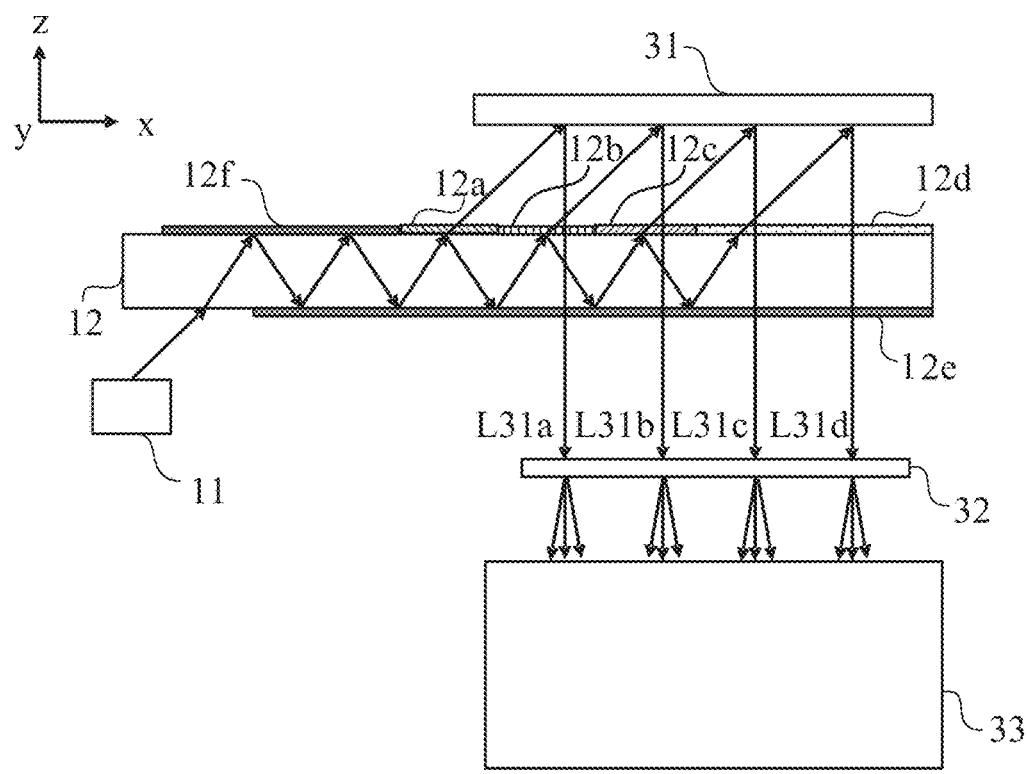
FIG. 3 is a configuration diagram of an image display apparatus according to Example 1.

Referring now to FIG. 3, a description will be given of an image display apparatus 300 according to this example. FIG. 3 is a configuration diagram of the image display apparatus 300. The image display apparatus 300 includes the light source apparatus 10, a digital mirror device 31 having a plurality of pixels each including micromirrors, a diffusion plate 32, and a projection lens 33.

The digital mirror device 31 is an image display element configured to generate an image by temporally tilting each micromirror. The digital mirror device 31 according to this example has a deflection angle of the micromirror of 17 degrees, and converts light incident at an incident angle of 34 degrees into emission light as turning-on light (ON light) at an incident angle of 0 degrees. The light beam L12 emitted from the light guide plate 12 illuminates the digital mirror device 31 at an incident angle θa=34.0 degrees. The turning-on light reflected by the digital mirror device 31 is emitted as light beams L31 (L31a, L31b, L31c, L31d), passes through the light guide plate 12, is diffused by the diffusion plate 32, and then illuminates the illuminated surface through the projection lens 33. The diffusion plate 32 may be disposed between the digital mirror device 31 and the light guide plate 12. The light beams L31 are diffused by the diffusion plate 32 to adjust them to the F-number of the projection lens 33 in order to illuminate the digital mirror device 31 with substantially parallel light.

The following inequality may be satisfied:

$$0 \leq T(A) < 20 \tag{1}$$

where T(A) is a transmittance (%) of the fifth dielectric film 12e in a case where an incident angle A (degrees) of a principal ray incident on the fifth dielectric film 12e is 10 degrees or higher regarding a peak wavelength of the light beam at which the light source 11 has maximum efficiency (if there are a plurality of light sources, the peak wavelength of each light source).

In a case where the value becomes higher than the upper limit of inequality (1), the light utilization efficiency of the light beam guided through the light guide plate 12 decreases. The incident angle A corresponds to the light beam angle (incident angle) θ in this example.

Inequality (1) may be replaced with inequality (1a) below:

$$0 \leq T(A) < 15 \tag{1a}$$

Inequality (1) may be replaced with inequality (1b) below:

$$0 \leq T(A) < 10 \tag{1b}$$

The fifth dielectric film 12e may satisfy the following inequality in addition to inequality (1) regarding the principal wavelength of the light source 11 (the peak wavelength of the light beam at which the light source 11 has maximum efficiency) where the incident angle A is 0 degrees:

$$80 < T(0) \leq 100 \tag{2}$$

In a case where the value becomes lower than the lower limit of inequality (2), the amount of the turning-on light reflected by the digital mirror device 31 guided to the projection lens 33 decreases, and the light utilization efficiency decreases.

Inequality (2) may be replaced with inequality (2a) below:

$$90 < T(0) \leq 100 \tag{2a}$$

Inequality (2) may be replaced with inequality (2b) below:

$$95 < T(0) \leq 100 \tag{2b}$$

In order to separate the light beam with a dielectric film, the incident angle A (degrees) may be selected within a range of inequality (3) below:

$$10 < A < \text{Arcsin}(1/n) \tag{3}$$

where n is a refractive index within the light guide plate 12.

In a case where the value becomes lower than the lower limit of inequality (3), it becomes difficult to design a dielectric film that satisfies inequalities (1) and (2). On the other hand, in a case where the value becomes higher than the upper limit of inequality (3), the light beam guided within the light guide plate 12 is totally reflected, so that the separated light beam cannot be extracted with the configuration according to this example.

Inequality (3) may be replaced with inequality (3a) below:

$$12 < A < \text{Arcsin}(1/n) \tag{3a}$$

Inequality (3) may be replaced with inequality (3b) below:

$$15 < A < \text{Arcsin}(1/n) \tag{3b}$$

In order to satisfy inequalities (1) and (2), the following inequality (4) may be satisfied:

$$0.000 < W/R < 0.030 \tag{4}$$

where R (nm) is a center wavelength of at least one spectrum of the light beam from the light source 11, and W (nm) is a half maximum full-width of the spectrum.

The center wavelength R in this example has 450 nm, 520 nm, or 635 nm, which is the principal wavelength of the laser light source (the peak wavelength of the light beam with maximum efficiency). In a case where the value becomes higher than the upper limit of inequality (4), it becomes difficult to design a dielectric film that controls transmission and reflection depending on the angle as illustrated in inequalities (1) and (2) over a wide wavelength range, and the light utilization efficiency decreases.

Inequality (4) may be replaced with inequality (4a) below:

$$0.000 < W/R < 0.020 \tag{4a}$$

Inequality (4) may be replaced with inequality (4b) below:

$$0.000 < W/R < 0.015 \tag{4b}$$

In this example, the following inequality may be satisfied:

$$0.5 < Fn \times \tan(B) < 5.0 \tag{5}$$

where B (degrees) is a half maximum full-width of the diffusion angle of the diffusion plate 32, and Fn is an F-number of the projection lens 33.

In a case where the value becomes higher than the upper limit of inequality (5), some of light cannot be taken in by the projection lens 33 and the light utilization efficiency will decrease. On the other hand, in a case where the value becomes lower than the lower limit of inequality (5), the effective F-number increases and the modulation transfer function (MTF) of the projection light decreases.

Inequality (5) may be replaced with inequality (5a) below:

$$0.6 < Fn \times \tan(B) < 5.0 \tag{5a}$$

Inequality (5) may be replaced with inequality (5b) below:

$$0.7 < Fn \times \tan(B) < 4.0 \tag{5b}$$

The separator according to this example includes, but is not limited to, three types of dielectric films, that is, the first dielectric film 12*a*, the second dielectric film 12*b*, and the third dielectric film 12*c*, as long as it has a plurality (two types or more) of dielectric films. N types of dielectric films (N areas) of the separator are arranged in order of the first dielectric film (first area), the second dielectric film (second area), . . . , the (N−1)th dielectric film ((N−1)th area), and the Nth dielectric film (Nth area), along the x direction.

T[M] (%) is a transmittance at the ray angle θ (incident angle of each area) of the principal wavelength (the peak wavelength of the light beam at which the light source 11 has the maximum efficiency) of the light beam (principal ray) incident on the M-th dielectric film (M-th area). That is, T[N−1] is a transmittance (%) of a light beam incident on the (N−1)th area and T[N] is a transmittance (%) of a light beam incident on the Nth area, regarding the peak wavelength of the light beam at which the light source has the maximum efficiency. Then, the following inequality may be satisfied:

$$1.1 \times T[N-1] < T[N] \tag{6}$$

In a case where the value becomes lower than the lower limit of inequality (6), a ratio between the light amount transmitting through the (N−1)th dielectric film and the light amount transmitting the Nth dielectric film deviates from 1. As a result, the illumination light that illuminates the digital mirror device 31 becomes non-uniform, and the image quality deteriorates.

Inequality (6) may be replaced with inequality (6a) below:

$$1.2 \times T[N-1] < T[N] \tag{6a}$$

Inequality (6) may be replaced with inequality (6b) below:

$$1.3 \times T[N-1] < T[N] \tag{6b}$$

In order to make the light guide plate 12 thinner, the angle θ of the light beam propagating in the x direction may be increased. According to the Snell's law, for the predetermined incident angle θa, the smaller the refractive index n becomes, the larger the angle θ becomes. Therefore, in this example, the refractive index n of the light guide plate 12 may satisfy the following inequality (7):

$$n < 1.80 \tag{7}$$

Inequality (7) may be replaced with inequality (7a) below:

$$n < 1.70 \tag{7a}$$

Inequality (7) may be replaced with inequality (7b) below:

$$n < 1.60 \tag{7b}$$

Since a laser light source emits light with a Gaussian angular distribution, the collimated light beam generally has an illuminance distribution with high illuminance at the center and low illuminance at the periphery. In order to improve the uniformity of the illuminance of the illumination light, the collimated light beam emitted from the light source 11 may have a uniform illuminance distribution.

Figure 10:
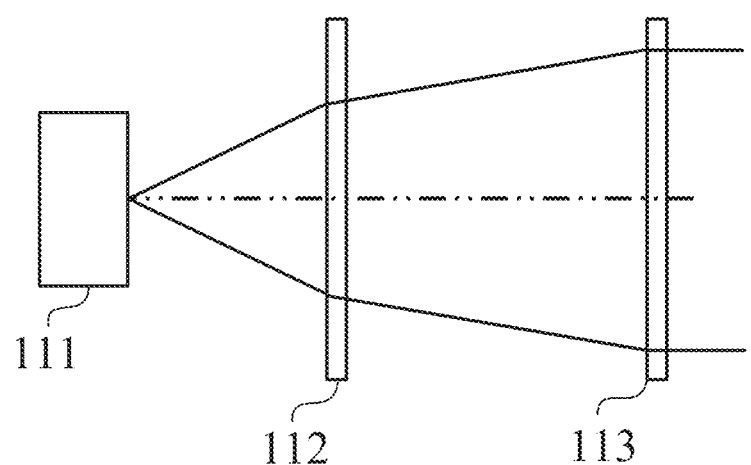
FIG. 10 is a configuration diagram of a light source according to each embodiment.

FIG. 10 is a configuration diagram of the light source 11. The light source 11 includes a laser light source 111, a first deflection element 112, and a second deflection element 113. The first deflection element 112 and the second deflection element 113 are collimators configured to deflect radiated light with the Gaussian angular distribution from the laser light source 111 into radiated light with a uniform angular distribution and to collimate the light through the second deflection element 113. The first deflection element 112 and the second deflection element 113 are optical elements such as a metasurface, a diffractive element, or an aspheric collimator lens. This example is not limited to the configuration illustrated in FIG. 10; for example, the first deflection element 112 and the second deflection element 113 may be provided on both sides of a single optical element. Since a general collimated light beam has a circular or elliptical distribution, each deflector may shape the illuminance distribution of the collimated light beam into a rectangular distribution.

Example 2

Figure 4:
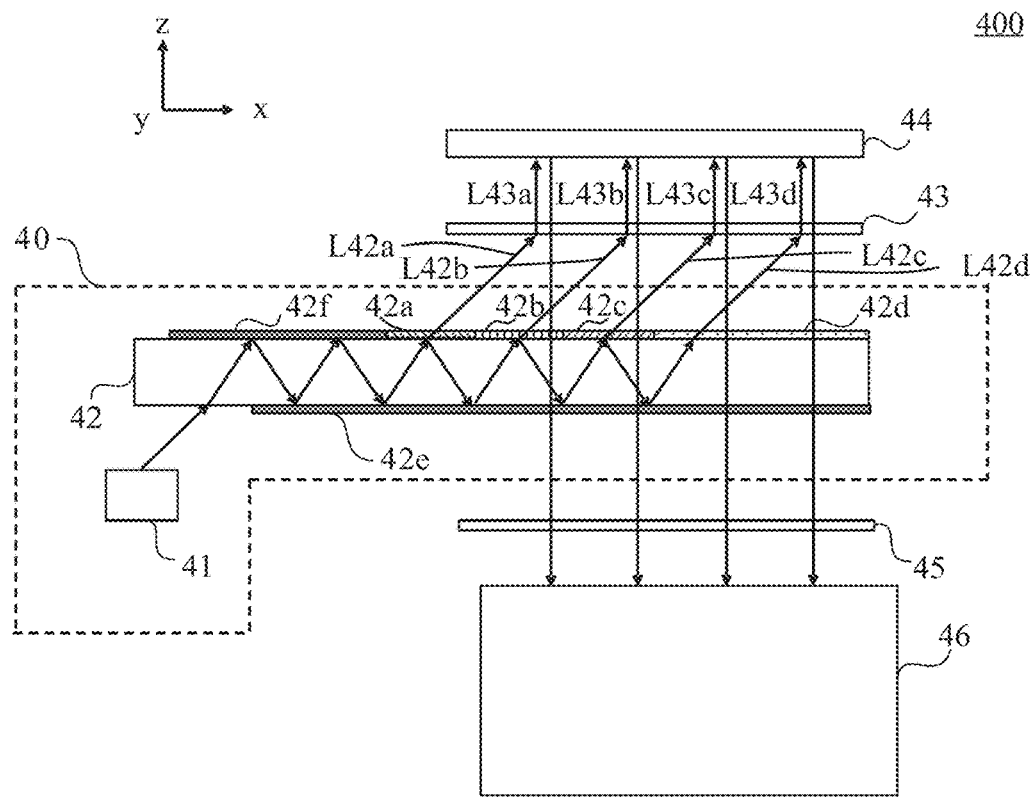
FIG. 4 is a configuration diagram of an image display apparatus according to Example 2.

Referring now to FIG. 4, a description will be given of an image display apparatus 400 according to Example 2. FIG. 4 is a configuration diagram of the image display apparatus 400. The image display apparatus 400 includes a light source apparatus 40, a diffractive element 43, a reflection type liquid crystal panel 44, a polarizing plate 45, and a projection lens 46.

The diffractive element 43 includes a fine structure of several tens of nanometers to several micrometers, and is adapted to diffract a predetermined polarized light and transmit polarized light orthogonal to the predetermined polarized light. The diffractive element 43 according to this example is a diffractive element configured to diffract polarized light in the y direction and to transmit polarized light in the x direction.

The light source apparatus 40 has a light source 41 and a light guide plate (light guide member) 42. The light guide plate 42 includes a first dielectric film 42a, a second dielectric film 42b, a third dielectric film 42c, a fourth dielectric film 42d, a fifth dielectric film 42e, and a sixth dielectric film 42f. The first dielectric film 42a, the second dielectric film 42b, the third dielectric film 42c, the fourth dielectric film 42d, and the sixth dielectric film 42f are formed on the second surface of the light guide plate 42, and the fifth dielectric film 42e is formed on the first surface of the light guide plate 42.

The light source apparatus 40 separates the light beam using the same principle as that of the light source apparatus 10 of Example 1, and emits the light beams L42 (L42a, L42b, L42c, L42d) from the light guide plate 42. In this example, each light beam L42 emitted from the light guide plate 42 is polarized light polarized in the y direction. In a case where a laser light source is used as the light source 41, the polarized light can be easily polarized in a predetermined direction by properly determining the direction of the laser light source.

The light beam L42, which is polarized light polarized in the y direction, is diffracted by the diffractive element 43 so that it approximately perpendicularly enters the reflection type liquid crystal panel 44. The diffracted light beams L43 (L43a, L43b, L43c, L43d) are modulated into image light by the reflection type liquid crystal panel 44. The turning-on light is polarized light that has been polarized in the x direction, and the turning-off light is polarized light that remains polarized in the y direction. Each light beam L43 as the polarized light in the x direction passes through the diffractive element 43, passes through the light guide plate 42, passes through the polarizing plate 45, and is projected onto the illuminated surface by the projection lens 46.

Example 3

Figure 5:
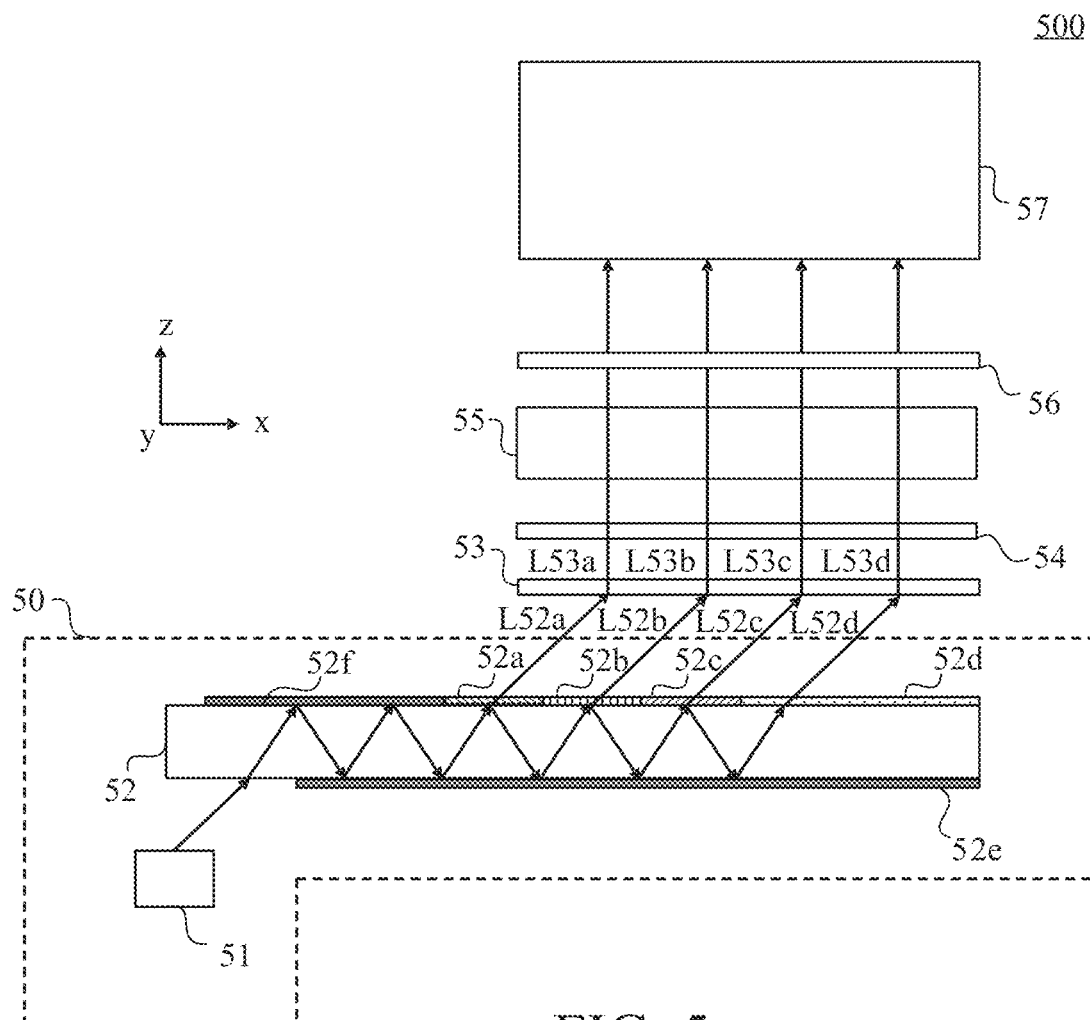
FIG. 5 is a configuration diagram of an image display apparatus according to Example 3.

Referring now to FIG. 5, a description will be given of an image display apparatus 500 according to Example 3. FIG. 5 is a configuration diagram of the image display apparatus 500. The image display apparatus 500 includes a light source apparatus 50, a deflector 53, a first polarizing plate 54, a transmission type liquid crystal panel 55, a second polarizing plate 56, and a projection lens 57.

The light source apparatus 50 includes a light source 51 and a light guide plate (light guide member) 52. The light guide plate 52 includes a first dielectric film 52a, a second dielectric film 52b, a third dielectric film 52c, a fourth dielectric film 52d, a fifth dielectric film 52e, and a sixth dielectric film 52f. The first dielectric film 52a, the second dielectric film 52b, the third dielectric film 52c, the fourth dielectric film 52d, and the sixth dielectric film 52f are formed on the second surface of the light guide plate 52, and the fifth dielectric film 52e is formed on the first surface of the light guide plate 52.

The light source apparatus 50 separates the light beam using the same principle as that of the light source apparatus 10 of Example 1, and emits the light beams L52 (L52a, L52b, L52c, L52d) from the light guide plate 52. In this example, similarly to Example 2, each light beam L52 emitted from the light guide plate 52 is polarized light that is polarized in the y direction. The light beam L52 as polarized light polarized in the y direction, is deflected by the deflector 53 so as to approximately perpendicularly enter the transmission type liquid crystal panel 55. The deflected light beams L53 (L53a, L53b, L53c, L53d) enter the transmission type liquid crystal panel 55 and are modulated into image light. The turning-on light is polarized light that has been polarized in the x direction, and the turning-off light is polarized light that remains polarized in the y direction. The light beam L52 polarized in the x direction passes through the second polarizing plate 56 and is projected onto the target surface by the projection lens 57. The turning-off light polarized in the y direction is absorbed by the second polarizing plate 56.

In this example, the deflector 53 may be any optical elements as long as it changes the angle of the light beam, such as a diffractive element, a prism array, a holographic element, and a metasurface.

Example 4

Figure 6:
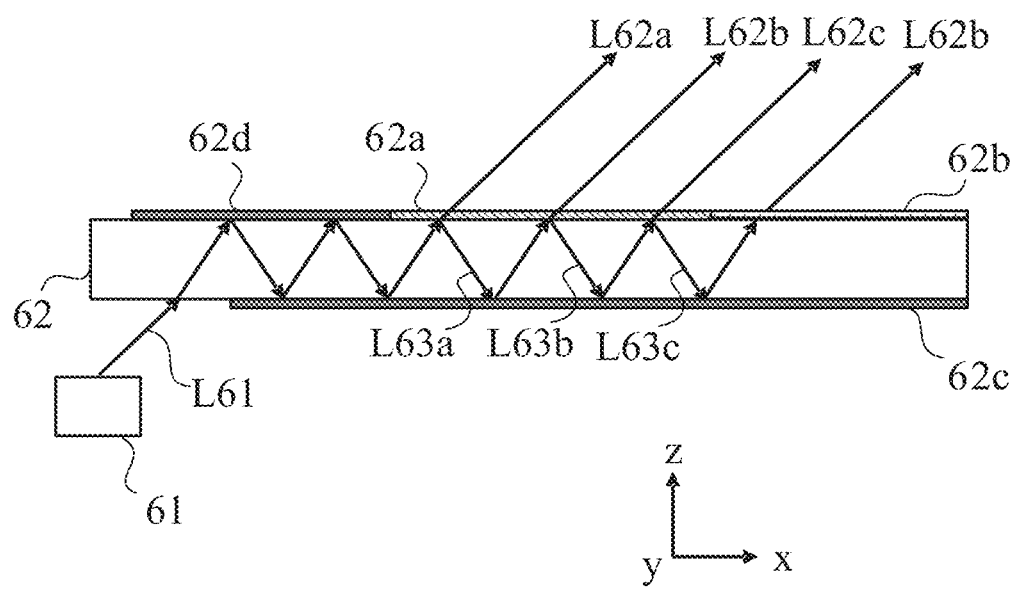
FIG. 6 is a configuration diagram of a light source apparatus according to Example 4.

Referring now to FIG. 6, a description will be given of a light source apparatus 60 according to Example 4. FIG. 6 is a configuration diagram of the light source apparatus 60. The light source apparatus 60 includes a light source 61 and a light guide plate (light guide member) 62.

The light guide plate 62 includes a first dielectric film 62a, a second dielectric film 62b, a third dielectric film 62c, and a fourth dielectric film 62d. The light guide plate 62 includes a first surface (the bottom surface of the light guide plate 62 in FIG. 6) and a second surface (the top surface of the light guide plate 62 in FIG. 6) opposite to the first surface. The first dielectric film 62a, the second dielectric film 62b, and the fourth dielectric film 62d are formed on the second surface, and the third dielectric film 62c is formed on the first surface. The first dielectric film 62a constitutes a separator, which has a characteristic of dividing a light beam propagating at a ray angle θ (degrees) within the light guide plate 62 at a predetermined ratio (where the transmittance of the first dielectric film 62a is 25%). The second dielectric film 62b is an antireflection film. The third dielectric film 62c and the fourth dielectric film 62d are reflective films (reflector) configured to reflect the light beam at the ray angle θ. In this example, the incident angle (ray angle θ) of the light beam incident on the second surface of the light guide plate 62 is smaller than the critical angle.

The light beam L61 from the light source 61 enters the light guide plate 62, is guided in the x direction via the third dielectric film 62c and the fourth dielectric film 62d, and is converted into the light beam L62a (25% of the light beam L61) and a light beam L63a (75% of the light beam L61) by the first dielectric film 62a. The light beam L63a enters the first dielectric film 62a again and is separated into a light beam L62b (18.8% of the light beam L61) and a light beam L63b (56.3% of the light beam L61). The light beam L63b enters the first dielectric film 62a again and is separated into a light beam L62c (14.1% of the light beam L61) and a light beam L63c (42.2% of the light beam L61). The light beam L63c is emitted as a light beam L62d (42.2% of the light beam L61) via the second dielectric film 62b. The light beam L62 emitted from the light guide plate 62 is used as a light beam for illuminating an unillustrated image display element or the like.

Example 5

Figure 7:
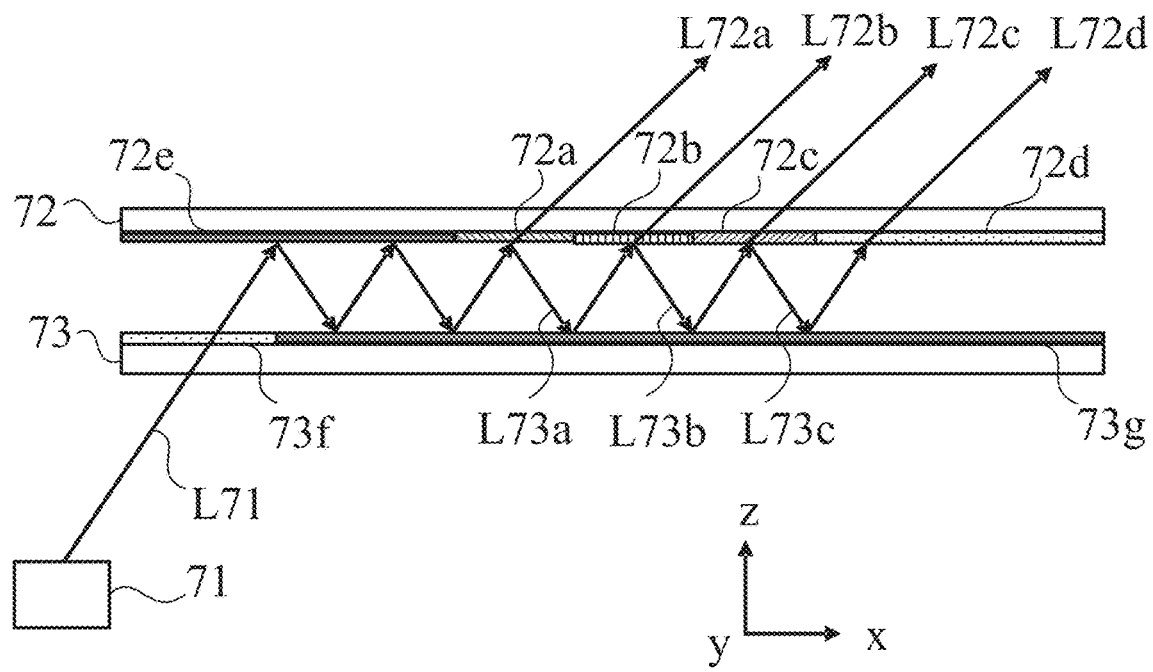
FIG. 7 is a configuration diagram of a light source apparatus according to Example 5.

Referring now to FIG. 7, a description will be given of a light source apparatus 70 according to Example 5. FIG. 7 is a configuration diagram of the light source apparatus 70. The light source apparatus 70 includes a light source 71, a first flat plate 73, and a second flat plate 72. The first flat plate 73 and the second flat plate 72 constitute a light guide plate (light guide member). In this example, a light beam is guided in the x direction within space sandwiched between the first flat plate 73 and the second flat plate 72.

The second flat plate 72 has a first dielectric film 72a, a second dielectric film 72b, a third dielectric film 72c, a fourth dielectric film 72d, and a fifth dielectric film 72e on the second surface. The first flat plate 73 has a sixth dielectric film 73f and a seventh dielectric film 73g on the first surface. The second surface of the second flat plate 72 is a surface facing the first surface of the first flat plate 73. The light beam L71 incident on the light guide member is reflected within the space sandwiched between the first flat plate 73 and the second flat plate 72, and propagates in the x direction. The fourth dielectric film 72d and the sixth dielectric film 73f are antireflection films. The fifth dielectric film 72e and the seventh dielectric film 73g are reflective films (reflector). The first dielectric film 72a, the second dielectric film 72b, and the third dielectric film 72c constitute a separator, which separates a light beam using the same principle as that of Example 1.

A light beam L71 from the light source 71 enters the space between the second flat plate 72 and the first flat plate 73, and is guided in the x direction. The light beam in the space is separated into light beams L72 (72a, L72b, L72c) and light beams L73 (L73a, L73b, L73c) at the first dielectric film 72a, the second dielectric film 72b, and the third dielectric film 72c. The light beams L72 (L72a, L72b, L72c, L72d) emitted from the second flat plate 72 are used as light beams for illuminating an unillustrated image display element or the like.

Example 6

Figure 8:
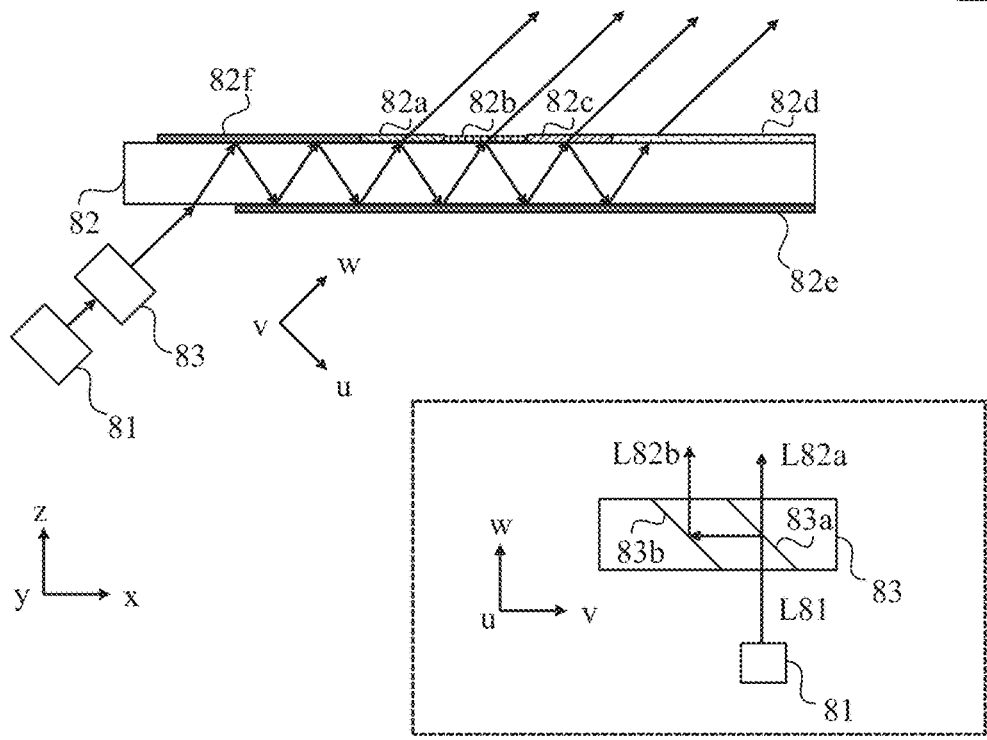
FIG. 8 is a configuration diagram of a light source apparatus according to Example 6.

Referring now to FIG. 8, a description will be given of a light source apparatus 80 according to Example 6. FIG. 8 is a configuration diagram of the light source apparatus 80. The light source apparatus 80 includes a light source 81, a light guide plate (light guide member) 82, and a light beam enlarging unit 83.

In this example, in order to enlarge the light beam not only in the x direction but also in the y direction, a light beam from the light source 81 enters the light guide plate 82 via the light beam enlarging unit 83. The light beam incident on the light guide plate 82 is separated according to the same principle as that of Example 1, and is emitted from the light guide plate 82. As illustrated in a detailed view of the light guide plate 82 at the lower right of FIG. 8, the light beam enlarging unit 83 has a light beam separating (splitting) surface 83a and a reflective surface 83b. The light beam separating surface 83a has a characteristic of transmitting and reflecting the incident light beam at a predetermined ratio. The light beam separating surface 83a according to this example has, but is not limited to, a transmittance of 50% and a reflectance of 50%.

A collimated light beam L81 from the light source 81 is separated by the light beam separating surface 83a. The transmitted light is emitted as a light beam L82a. The reflected light is reflected by the reflective surface 83b and is emitted as a light beam L83b. In this example, a light beam is separated into two light beams, but this example is not limited to this implementation, and a plurality of light beam separating surfaces may be provided to separate a light beam into three or more light beams.

Example 7

Figure 9:
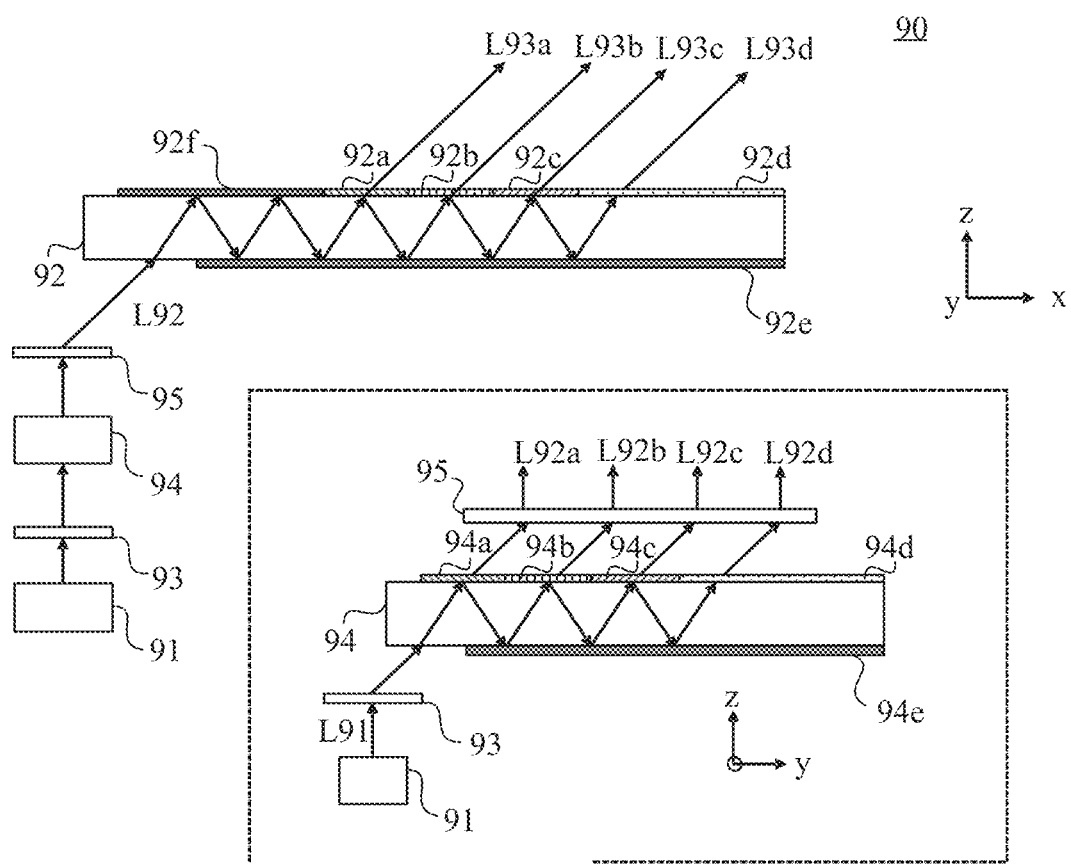
FIG. 9 is a configuration diagram of a light source apparatus according to Example 7.

Referring now to FIG. 9, a description will be given of a light source apparatus 90 according to Example 7. FIG. 9 is a configuration diagram of the light source apparatus 90. The light source apparatus 90 includes a light source 91, a first light guide plate 92, a first deflector 93, a second light guide plate 94, and a second deflector 95.

The first light guide plate 92 includes a first dielectric film 92a, a second dielectric film 92b, a third dielectric film 92c, a fourth dielectric film 92d, a fifth dielectric film 92e, and a sixth dielectric film 92f. The first dielectric film 92a, the second dielectric film 92b, and the third dielectric film 92c constitute a separator. As illustrated in a detailed diagram of the second light guide plate 94 at the lower right of FIG. 9, the second light guide plate 94 includes a seventh dielectric film 94a, an eighth dielectric film 94b, a ninth dielectric film 94c, a tenth dielectric film 94d and an eleventh dielectric film 94e. The seventh dielectric film 94a, the eighth dielectric film 94b, and the ninth dielectric film 94c constitute a separator. The first light guide plate 92 and the second light guide plate 94 separate the light beam using the same principle as that of Example 1.

A light beam L91 from the light source 91 is deflected by the first deflector 93 and enters the second light guide plate 94. The light beam L91 is divided by the second light guide plate 94, deflected by the second deflector 95, and emitted as light beams L92 (L92a, L92b, L92c, L92d). The light beams L92 enter the first light guide plate 92, are emitted as light beams L93 (L93a, L93b, L93c, L93d), and are used as light beams for illuminating an unillustrated image display element or the like.

Each example can provide a light source apparatus and an image display apparatus that are small and capable of highly efficiently and uniformly illuminating an image display element.

While the disclosure has described example embodiments, it is to be understood that some embodiments are not limited to the disclosed embodiments. The scope of the following claims is to be accorded the broadest interpretation so as to encompass all such modifications and equivalent structures and functions.

This application claims the benefit of Japanese Patent Application No. 2023-047746, which was filed on Mar. 24, 2023, and which is hereby incorporated by reference herein in its entirety.

What is claimed is:

1. A light source apparatus comprising:
a light source; and
a light guide member which a light beam from the light source enters,
wherein the light guide member includes:
a reflector configured to reflect the light beam on a first surface of the light guide member, and
a separator configured to separate the light beam on a second surface of the light guide member different from the first surface into a reflected light beam and a transmitting light beam,
wherein the light beam incident on the light guide member is reflected by each of the reflector and the separator and propagates in a first direction,
wherein among light beams propagated through the light guide member, the light beam separated by the separator is emitted from the light guide member,
wherein an incident angle of the light beam incident on the second surface of the light guide member is smaller than a critical angle, and
wherein the following inequality is satisfied:

$$0 \leq T(A) < 20$$

where T (A) is a transmittance (%) of the reflector in a case where an incident angle A (degrees) of a principal ray incident on the reflector is 10 degrees or higher regarding a peak wavelength of the light beam at which the light source has maximum efficiency.

2. The light source apparatus according to claim 1, wherein each of the separator and the reflector includes a dielectric multilayer film.

3. The light source apparatus according to claim 1, wherein the following inequality is satisfied regarding the peak wavelength of the light beam where the incident angle A is 0 degrees:

$$80 < T(0) \leq 100.$$

4. The light source apparatus according to claim 1, wherein the separator has N areas that include a first area, ..., an (N−1)th area, and an Nth area in order along the first direction, and the following inequality is satisfied:

$$1.1 \times T[N-1] < T[N]$$

where T [N−1] is a transmittance (%) of a light beam incident on the (N−1)th area and T [N] is a transmittance (%) of a light beam incident on the Nth area regarding a peak wavelength of the light beam at which the light source has maximum efficiency.

5. The light source apparatus according to claim 1, wherein the following inequality is satisfied:

$$0.000 < W/R < 0.030$$

where R (nm) is a center wavelength of at least one spectrum of the light beam from the light source, and W (nm) is a half maximum full-width.

6. The light source apparatus according to claim 1,
wherein the light source includes a laser light source and a collimator, and
wherein the collimator collimates the light beam from the laser light source to make illuminance distribution uniform.

7. The light source apparatus according to claim 1,
wherein the light guide member includes a light guide plate, and
wherein the second surface is a surface of the light guide plate opposite to the first surface of the light guide plate.

8. The light source apparatus according to claim 1,
wherein the light guide member includes a first flat plate and a second flat plate,
wherein the second surface of the second flat plate is a surface opposite to the first surface of the first flat plate, and
wherein the light beam incident on the light guide member is reflected in space sandwiched between the first flat plate and the second flat plate and propagates in the first direction.

9. An image display apparatus comprising:
the light source apparatus according to claim 1; and
an image display element,
wherein the light beam emitted from the light guide member illuminates the image display element.

10. The image display apparatus according to claim 9, wherein each of the separator and the reflector includes a dielectric multilayer film.

11. The image display apparatus according to claim 9, wherein the following inequality is satisfied:

$$0 \leq T(A) < 20$$

where T (A) is a transmittance (%) of the reflector in a case where an incident angle A (degrees) of a principal ray incident on the reflector is 10 degrees or higher regarding a peak wavelength of the light beam at which the light source has maximum efficiency.

12. The image display apparatus according to claim 11, wherein the following inequality is satisfied regarding the peak wavelength of the light beam where the incident angle A is 0 degrees:

$$80 < T(0) \leq 100.$$

13. The image display apparatus according to claim 9, wherein the separator has N areas that include a first area, ..., an (N−1)th area, and an Nth area in order along the first direction, and the following inequality is satisfied:

$$1.1 \times T[N-1] < T[N]$$

where T [N−1] is a transmittance (%) of a light beam incident on the (N−1)th area and T [N] is a transmittance (%) of a light beam incident on the Nth area regarding a peak wavelength of the light beam at which the light source has maximum efficiency.

14. The image display apparatus according to claim 9, wherein the following inequality is satisfied:

$$0.000 < W/R < 0.030$$

where R (nm) is a center wavelength of at least one spectrum of the light beam from the light source, and W (nm) is a half maximum full-width.

15. The image display apparatus according to claim 9, wherein the light source includes a laser light source and a collimator, and
wherein the collimator collimates the light beam from the laser light source to make illuminance distribution uniform.

16. The image display apparatus according to claim 9, wherein the light guide member includes a light guide plate, and
wherein the second surface is a surface of the light guide plate opposite to the first surface of the light guide plate.

17. The image display apparatus according to claim 9, wherein the light guide member includes a first flat plate and a second flat plate,
wherein the second surface of the second flat plate is a surface opposite to the first surface of the first flat plate, and
wherein the light beam incident on the light guide member is reflected in space sandwiched between the first flat plate and the second flat plate and propagates in the first direction.

18. A light source apparatus comprising:
a light source; and
a light guide member which a light beam from the light source enters,
wherein the light guide member includes:
a reflector configured to reflect the light beam on a first surface of the light guide member, and
a separator configured to separate the light beam on a second surface of the light guide member different from the first surface into a reflected light beam and a transmitting light beam,
wherein the light beam incident on the light guide member is reflected by each of the reflector and the separator and propagates in a first direction,
wherein among light beams propagated through the light guide member, the light beam separated by the separator is emitted from the light guide member,
wherein an incident angle of the light beam incident on the second surface of the light guide member is smaller than a critical angle, and
wherein the separator has N areas that include a first area, ..., an (N−1)th area, and an Nth area in order along the first direction, and the following inequality is satisfied:

$$1.1 \times T[N-1] < T[N]$$

where T [N−1] is a transmittance (%) of a light beam incident on the (N−1)th area and T [N] is a transmittance (%) of a light beam incident on the Nth area regarding a peak wavelength of the light beam at which the light source has maximum efficiency.

19. A light source apparatus comprising:
a light source; and
a light guide member which a light beam from the light source enters,
wherein the light guide member includes:
a reflector configured to reflect the light beam on a first surface of the light guide member, and
a separator configured to separate the light beam on a second surface of the light guide member different from the first surface into a reflected light beam and a transmitting light beam,
wherein the light beam incident on the light guide member is reflected by each of the reflector and the separator and propagates in a first direction,
wherein among light beams propagated through the light guide member, the light beam separated by the separator is emitted from the light guide member,
wherein an incident angle of the light beam incident on the second surface of the light guide member is smaller than a critical angle, and
wherein the following inequality is satisfied:

$$0.000 < W/R < 0.030$$

where R (nm) is a center wavelength of at least one spectrum of the light beam from the light source, and W (nm) is a half maximum full-width.

* * * * *